10/22/85 XR 4,548,645

United States Patent [19]

Thiebaut

[11] Patent Number: 4,548,645

[45] Date of Patent: Oct. 22, 1985

[54] LITHOGRAPHIC WATER BASED FOUNTAIN SOLUTION CONCENTRATES

[75] Inventor: Bernard A. Thiebaut, Villiers, Me.

[73] Assignee: Inmont Corporation, Clifton, N.J.

[21] Appl. No.: 597,798

[22] Filed: Dec. 21, 1983

[51] Int. Cl.[4] .................... C09K 3/18

[52] U.S. Cl. .................... 106/2; 101/451

[58] Field of Search .................... 106/2; 101/451

[56] References Cited

U.S. PATENT DOCUMENTS

| | | | |
|---|---|---|---|
| 3,028,804 | 4/1962 | Neugebauer et al. | 101/451 |
| 3,257,941 | 6/1966 | Dam et al. | 106/2 |
| 3,272,121 | 9/1966 | Uber et al. | 101/462 |
| 3,354,824 | 11/1967 | Griffith et al. | 101/451 |
| 3,398,002 | 8/1968 | Bondurant et al. | 106/2 |
| 3,687,694 | 8/1972 | Van Dusen | 106/2 |
| 4,030,417 | 6/1977 | Lipovac | 101/451 |
| 4,116,896 | 9/1978 | Garrett et al. | 260/17 R |
| 4,148,767 | 4/1979 | Spicer et al. | 106/14.5 |
| 4,150,996 | 4/1979 | Druker et al. | 106/2 |
| 4,208,212 | 6/1980 | Kuzuwata et al. | 106/2 |
| 4,213,887 | 7/1980 | Walls et al. | 101/451 |
| 4,238,279 | 12/1980 | Tsubai et al. | 101/451 |
| 4,247,328 | 1/1981 | Lawson et al. | 106/2 |
| 4,278,467 | 7/1981 | Fadner | 106/2 |
| 4,285,276 | 8/1981 | Fromson et al. | 106/2 |
| 4,291,117 | 9/1981 | Ohishi et al. | 430/309 |
| 4,374,036 | 2/1983 | Canale et al. | 252/135 |

OTHER PUBLICATIONS

The Printing Ink Manual, Second Edition, Edited by F. A. Askew-Composition of Typical Fountain Solutions.

Offset Lithography, Bruce E. Tory, 1957-Fountain Solutions and the use of Buffer Salts in Fountain Solutions to Control pH-pp. 73-81.

The Lithographic Manual, 6th Ed., Raymond Blair, Charles Shapiro, 1980-Information on Dampening Systems, pp. 12:28-12:30 and Information on the Fountain Solutions, pp. 12:47-12:49.

Web Offset Press Troubles, Robert F. Reed, 1966-Information on Fountain Solutions-pp. 70, 108, 109, 148 and 242.

Everything to know about Photo Offset, John E. Cogoli, 1973-Information on Fountain Solutions, pp. 326-328.

*Primary Examiner*—Lorenzo B. Hayes
*Attorney, Agent, or Firm*—E. R. Skula

[57] ABSTRACT

Lithographic fountain solution concentrates which are combined with water to form improved fountain solutions. The concentrates contain specific quantities of buffer salts resulting in improved printing process characteristics. The buffer salts are the salts of polycarboxylic acids and organic bases such as amines. The use of alcohol in the fountain solutions is eliminated or substantially reduced.

15 Claims, No Drawings

LITHOGRAPHIC WATER BASED FOUNTAIN SOLUTION CONCENTRATES

DESCRIPTION

1. Technical Field

This invention relates to water based concentrates which are mixed with water to form lithographic fountain solutions.

2. Background Art

The web offset and lithographic printing processes employ planographic plates which transfer ink to a blanket roll which, in turn, then transfers the ink to a substrate thereby forming the printed images. The plates are referred to as planographic since the image and non-image areas are in the same plane. The plates are constructed so that with proper treatment the image areas are hydrophobic and oleophilic and thereby receptive to inks. The non-image areas are hydrophilic and are water receptive. In order to maintain the hydrophilic characteristics of the non-image areas, and to prevent ink from accumulating on the non-image areas, it is necessary to continuously treat the plate with a water based fountain solution. The water based fountain solution can be applied to the plate with a separate roll prior to inking, or, the ink and fountain solution can be applied simultaneously as in the Dahlgren type of system.

Although plain tap water can be used as a fountain solution, it is known in the art to include additional ingredients in combination with water as a fountain solution in order to improve the printing characteristics. It is known to include low boiling point alcohols, such as isopropanol and ethanol, and various surfactants to reduce surface tension and permit better wetting of the plates. It is also known to include an acid or a buffer to achieve a pH range of 4.0–6.0. Polyols such as glycerine are introduced into a fountain solution to act as a humectant and lubricant, and to assist in maintaining a thin layer of water on the hydrophilic areas of the plate. Biocides such as bactericides and algicides are added to control microbiological growth in the fountain solution.

Typically, fountain solutions are prepared at the printing site by mixing fountain concentrates with tap water.

The use of fountain solutions has been found to have numerous beneficial effects upon the printing process including reduction of water ink emulsion, reduced scumming, reduced paper defibration, reduced paper breakage, accelerated drying, longer press runs, etc.

A typical fountain solution known in the art contains ethyl alcohol or isopropyl alcohol, glycerine, surfactant, bactericide or algicide, various amounts of an acidifying agent such as phosphoric acid, and water.

U.S. Pat. No. 4,247,328 to Lawson et al discloses lithographic fountain concentrates containing a desensitizing material. The preferred desensitizing materials disclosed are salts of acids such as citric acid, phosphoric acid, tartaric acid and EDTA. Lawson states that although acids can be used as a desensitizer, salts are preferred since they act as buffers to overcome the use of acidic or alkaline tap waters. Lawson requires the use of at least 50% organic solvent in the fountain solution concentrate.

U.S. Pat. No. 4,150,996 discloses a fountain solution concentrate containing sulfanilic acid, formaldehyde, sodium hydroxide, and gum arabic. Gum arabic has been found to have numerous negative effects including gumming and glazing of plates and rollers and promotion of the growth of bacteria and algae.

U.S. Pat. No. 4,278,467 to Fadner discloses a fountain solution which contains a substitutive replacement for isopropyl alcohol.

U.S. Pat. No. 4,116,896 to Garret et al discloses a fountain solution whereby detrimental precipitation is controlled in acidic alcohol/water fountain solutions by the use of a chelating agent.

Accordingly, what is needed in the art is an improved fountain solution with a strong buffering capacity which will maintain a given pH range over time during the printing process thereby resulting in improvements in said printing process. Additionally, the improved fountain solution should eliminate alcohol. or contain drastically reduced quantities of alcohol.

DISCLOSURE OF INVENTION

It has now been found that by formulating a fountain solution concentrate having a strong buffer formed by reacting a polycarboxylic acid with an organic base and mixing about 1.0 wt. % to 6.0 wt. % of said concentrate with water, a fountain solution exhibiting a superior buffering effect and containing no alcohol or extremely small qualtities of alcohol is obtained. The resultant fountain solution formed from a concentrate when used with a lithographic printing press results in the following unexpected and surprising improvements: longer press run, decreased scumming, decreased ink/water emulsification, decreased linting and difibration, decreased substrate breakage, improved drying, decreased strike-in, and improved ink/water balance.

This invention relates to concentrates for use in lithographic fountain solutions. The concentrates are a blend of a buffer, a polyol, water, and an alcohol. The concentrates used on lithographic presses using a Dahlgren dampening system do not contain alcohol. The concentrates of this invention can additionally contain a bactericide or algicide, and surfactants. The concentrate is blended with tap water to form a fountain solution such that the concentrate comprises 1% to 6% of the fountain solution. The buffers used in this invention are the salts of polycarboxylic acids and organic bases (amines). The polycarboxylic acids have a $pK_a$ between 3 and 6 while the bases must have a $pK_b$ between 2 and 9. The polycarboxylic acids may have at least one hydroxyl group.

DETAILED DESCRIPTION OF THE INVENTION

The present invention is directed to a water base concentrate for use in lithographic fountain solutions, wherein said concentrate is mixed in an amount of about 1.0 wt. % to 6.0 wt. % with water to form a fountain solution, said fountain solution concentrate characterized by:

water;

a buffer salt, comprising the salt of polycarboxylic acid having a $pK_a$ between 3 and 6 and an organic base having a $pK_b$ between 2 and 9;

low molecular weight alcohols;

an hygroscopic product such as glycerine or an equivalent polyol such as a polysaccharide or one of its derivatives (for example carboxymethylcellulose) or a product resulting from the polymerisation of the vinylpyrrodone, or a colloidal silicic acid;

and various optional ingredients such as surfactants, bactericides and/or algicides;

wherein said fountain solution made by mixing the concentrate with water, has a pH between about 4.7 and about 5.3, a surface tension between about $32\times10^{-3}$ Newton/m and about $52\times10^{-3}$ Newton/m. The surface tension is adjusted according to the type of dampening system. For classic dampening systems (water based systems) the surface tension will be selected preferably between about 44 and $52\times10^{-3}$ Newton/m. For alcohol dampening systems, the surface tension will be preferably between about 32 and $37\times10^{-3}$ Newton/m; in this case, by selecting the proper fountain additive, it will be possible to decrease or suppress the alcohol usually used in that dampening system. If it is necessary the surface tension could be adjusted by adding a non-foaming surfactant.

a sufficient buffer strength so that the pH variation is less than 1 unit when 5 cc of decinormal (0.1N) HCl or 5 cc of (0.1N)NaOH is added to 100 cc of the fountain solution.

The concentrate of this invention is blended with water to comprise 1% to 6% of the fountain solution. The resulting fountain solution has a pH between about 4.7 and about 5.3 and a surface tension between about 32 and $52\times00^{-3}$ Newton/m. The fountain solution made with this invention will have a buffering effect such that the pH vartiation will be less than one pH unit if either a strong base or a strong acid is added to the solution. For example, if 5 cc of decinormal (0.1N)NaOH or decinormal (0.1N)HCl is added to 100 cc of the solution of this invention, the pH variation will be less than one unit. With some preferred preparations of the invention, it is possible, with the same test to obtain pH variations which are less than 0.5 unit.

Carboxylic acids which can be used to form the buffer salts of this invention are citric acid, malic, glutaric, succinic, azelaic acid and similar polyacids which have a $pK_a$ between about 3 and about 6. The polyacids used to form the buffer salts may have other functional groups, such as hydroxyl groups. The organic bases contemplated by this invention are the amines including primary, secondary and tertiary amines, polyamines such as hydrazine and ethylenediamine, cyclic amines and aminoalcohols. These amines will have a $pK_b$ between about 2 and about 9 and preferably between 3 and 6.

A particularly useful buffer is the salt of citric acid and dimethylamine.

The $pK_a$ of a polycarboxylic acid— amine salt solution will vary in accordance with the number of acid groups which are neutralized on the polycarboxylic acid molecule by the organic base. It is preferred, according to my invention, to obtain buffer salts wherein a sufficient number of acid groups on the polycarboxylic acid molecule are unreacted in order to obtain the desired pH range of the fountain solution.

The fountain solution may contain, in addition to the above-described buffer, an hygroscopic product and an alcohol which homogeneize the different ingredients, additives such as a bactericide or an algicide, and detergents such as N-methyl pyrrolidone or various surfactants. The hygroscopic product may be glycerine or an equivalent polyol such as a polysaccharide or one of its derivatives (for example carboxymethylcellulose) or a vinylpyrrolidone polymer, or a colloidal silicic acid; it is used to maintain the quantity of water deposited on the plate and on the blanket. In fact, the water film thickness on the planographic plate is very thin due to the low surface tension of the fountain solutions of the invention. Consequently, the use of fountain solution is decreased during a typical press run. Another important technical consequence of the minimal amounts of water required by use of my invention is the faster drying of the prints. The bactericide and/or algicide used in the concentrate of this invention may be any such commercially available products. The term biocide as used herein refers to a bactericide, an algicide, or a combination thereof. A particularly useful and preferred embodiment of my invention is a concentrate for use in lithographic fountain solutions, wherein the concentrate is mixed in an amount of about 6 wt. % with water to form a fountain solution having a pH between 4.7 and 5.3, a surface tension between 32 and $52\times10^{-3}$ Newton/m and sufficient buffer strength so that the pH variation is less than 1 unit when strong acids or bases are added to the solution, comprising:

58.7 wt. % water 20.5 wt. % of a buffer salt solution comprising the salt of citric acid and dimethylamine 7 wt. % polyvinylpyrrolidone 5.3 wt. % ethanol 3.5 wt. % isopropanol 5 wt. % biocide As previously mentioned, the fountain solutions prepared from the concentrates of my invention when used with lithographic printing presses have demonstrated numerous beneficial results which are both unexpected and surprising including accelerated drying time, decreased linting, improved rub resistance, decreased use of fountain solution and decreased use of alcohol. Although the reasons for the unexpected results are not clear, the interactions of the fountain solution with the inks, the paper substrates, and the surface of the planographic plates are in my opinion the controlling factors. It is known in the art that the interaction of fountain solution with the ink and paper will affect the print characteristics and printing process characteristics. I have found that the novel fountain solutions of my invention when used in lithographic printing unexpextedly result in extremely thin layers of water being maintained on the hydrophilic portions of the plate. In addition, the strong buffering action of the buffer of my invention conpensates for the pH altering characteristics of various inks and paper substrates. Variations from an ideal pH range of 4.0–6.0 can have various adverse effects upon drying time, plate sensitivity, etc. Although fountain solutions typically contain up to 15 wt. % low molecular weight alcohols, the use of alcohol in the fountain solutions prepared with the concentrates of my invention are miniscule (0.04 wt. %–1.2 wt. %) and in the case of Dahlgren systems, can be eliminated, or substantially decreased.

The concentrations of buffer salts in the fountain solution concentrates of this invention range from about 7.0 wt. % to about 35.0 wt. %. The concentrations of buffer salts in the fountain solutions of this invention range from about 0.07 wt. % to about 2.1 wt. %. It is contemplated that, in order to obtain the required buffering effect, individual buffer salts, combinations of buffer salts, or combinations of buffer salts and acids may be used to prepare the fountain solution concentrates of this invention.

The fountain solution concentrates of my invention will have the following ranges of components:

40.0 wt. %–89.0 wt. % water
7.0 wt. %–35.0 wt. % buffer
5.0 wt. %–20.0 wt. % polyol
0.0 wt. %–10.0 wt. % low molecular weight alcohol
0.0 wt. %–0.1 wt. % surfactant
0.0 wt. %–6.0 wt. % Biocide

DESCRIPTION OF THE PREFERRED EMBODIMENTS

The following examples are given to further illustrate the invention but not to limit it in any way.

EXAMPLE 1

A buffer salt was prepared by reacting one mole of citric acid (monohydrated) with 2 moles of dimethylamine. 0.6 gram of salt was mixed into 100 grams of water to produce an aqueous solution having the following properties:

pH=5.3

Buffer effect

The addition of 5 cc of decinormal (0.1N) sodium hydroxide varied the pH from 5.3 to 5.8.

The addition of 5 cc of decinormal (0.1N) hydrochloric acid varied the pH from 5.3 to 4.9. Surface tension:=approximately $47.3\times10^{-3}$ Newton/m. In this example two acid groups of citric acid have been neutralized (the $pK_a$ of the second acid group being between 4.7 and 4.8).

EXAMPLE 2

A buffer salt was prepared by reacting 1 mole of monohydrated citric acid with 2 moles of ethanolamine. 0.6 gram of the buffer salt was mixed into 100 grams of water to produce an aqueous solution having the following properties:

pH=5.25

Buffer effect

The addition of 5 cc of decinormal (0.1N) sodium hydroxide raised the pH to 5.8.

The addition of 5 cc of decinormal (0.1N) hydrochloric acid lowered the pH to 4.8 Surface tension=$42.6\times10^{-3}$ Newton/m, approximately.

EXAMPLE 3

A buffer salt was prepared by reacting 1 mole of malic acid with 1.1 moles of dimethylamine. 0.6 gram of this salt was mixed with 100 grams of water to form an aqueous solution having the following properties:

pH=4.3

Buffer effect

The addition of 5 cc of decinormal (0.1N) sodium hydroxide raised the pH to 4.7.

The addition of 5 cc of decinormal (0.1N) hydrochloric acid lowered the pH to 4.1. Surface tension=$54.9\times10^{-3}$ Newton/m approximately.

In this example we have neutralized slightly more than 1 acid group of malic acid (the $pK_a$ of the first acidic function being 3.4 and the $pK_a$ of the second acid group being approximately 5.1).

EXAMPLE 4

A buffer salt was prepared by reacting 1 mole of monohydrated citric acid with 2 moles of cyclohexylamine. 0.6 gram of this salt was mixed with 100 grams of water to form an aqueous solution having the following characteristics:

pH=5.4

Buffer effect

The addition of 5 cc of decinormal (0.1N) sodium hydroxide raised the pH to 6.2.

The addition of 5 cc of decinormal (0.1N) hydrogen chloride lowered the pH to 4.9. Surface tension:=approximately $50.4\times10^{-3}$ Newton/m.

EXAMPLE 5

A buffer salt was prepared by reacting 1 mole of adipic acid with 1 mole of piperidine. 0.6 gram of this salt was mixed with 100 grams of water to form an aqueous solution having the following characteristics:

pH=5

Buffer effect

The addition of 5 cc of decinormal (0.1N) sodium hydroxide raised the pH to 5.3.

The addition of 5 cc of decinormal (0.1N) hydrogen chloride lowered the pH to 4.7

EXAMPLE 6

A buffer salt was prepared by reacting 1 mole of adipic acid with 1 mole of dimethylamine. 0.6 gram of this salt was mixed with 100 grams of water to form an aqueous solution having the following characteristics:

pH=4.9

Buffer effect

The addition of 5 cc of decinormal (0.1N) sodium hydroxide raised the pH to 5.1.

The addition of 5 cc of decinormal (0.1N) hydrogen chloride lowered the pH to 4.7.

EXAMPLE 7

We obtained results equivalent to those obtained in Examples 1–6 using the following acids and bases:

| | |
|---|---|
| Glumaric acid (1 mole) | Cyclohexylamine (1 mole) |
| Succinic acid (1 mole) | Ethylenediamine (0.5 mole) |
| Azelaic acid (1 mole) | Triethylamine (1 mole) |

EXAMPLE 8

Fountain Solution Concentrates

Fountain Solution concentrates were prepared by combining the following ingredients, which are listed in parts by weight:

| | A | B |
|---|---|---|
| Buffer salts of Examples 1 to 7 | 30.0 | 32.2 |
| Glycerine | 18.0 | 13.6 |
| Ethyl alcohol | 5.4 | 4.5 |
| Isopropyl alcohol | 3.6 | 2.8 |
| Bactericide | 0.9 | 0.9 |
| Water | 42.1 | 46.0 |
| Total: | 100.0 | 100.0 |

The concentrates as prepared in accordance with formulation A and B were mixed with water in a proportion of 1 to 6 parts of concentrate to 100 parts of water to form fountain solutions.

EXAMPLE 9

Other fountain solution concentrates were prepared by combining the following ingredients:

| | C | D |
|---|---|---|
| Buffer salts of Examples 1 to 7 | 7.4 | 20.5 |
| Polyvinylpyrrolidone | 5.0 | 7.0 |
| Ethyl alcohol | 2.9 | 5.3 |
| Isopropyl alcohol | 1.9 | 3.5 |
| Bactericide | 3.0 | 5.0 |
| Surfactant | 0.08 | 0.05 |
| Water | 79.72 | 58.65 |
| Total | 100.00 | 100.00 |

The concentrates as prepared in accordance with formulation C and D were mixed with water in a proportion of 1 to 6 parts of concentrate to 100 parts of water to form fountain solutions.

The use of the fountain solutions of Examples 8 and 9 results in the following unexpected improvements with any kind of printing press over conventional fountain solutions:

(a) decreased paper breakage (b) decreased paper linting and difibration resulting in fewer stoppages to clean the blankets (c) lower adherence of paper on the blanket (d) decreased ink/water emulsification (e) accelerated drying (f) improved rub resistance of the print.

Although this invention has been shown and described with respect to detailed embodiments thereof, it will be understood by those skilled in the art that various changes in form and detail thereof may be made without departing from the spirit and scope of the claimed invention.

We claim:

1. In a water dilutable concentrate for use in lithographic fountain solutions containing water, a buffer, a polyol and a surfactant the improvement comprising, as the buffer, at least on salt of (a) a polycarboxylic acid and (b) an organic amine, wherein the polycarboxylic acid has a $pK_a$ between about 3 and about 6, the organic amine has a $pK_b$ between about 2 and about 9, and the concentrate when mixed in an amount of about 1% to about 6% by weight with water yields a fountain solution having a pH between about 4.7 and about 5.3, a surface tension between about $32\times10^{-3}$ Newton/m and about $52\times10^{-3}$ Newton/m, and a sufficient buffer effect such that the pH variation of the fountain solution will be less than about one pH unit when 5 cc of decinormal NaOH or 5 cc of decinormal HCl is added to 100 cc of the fountain solution.

2. The concentrate of claim 1 which additionally contains 4 wt. %-10 wt. % of a low molecular weight alcohol.

3. The concentrate as recited in claim 1 wherein the polycarboxylic acid is citric acid and the organic amine is dimethyl amine.

4. The concentrate as recited in claim 2 additionally containing 0.5 wt. %-6.0 wt. % of a biocide.

5. The concentrate as recited in claim 3 additionally containing 0.5 wt. %-6.0 wt. % of a biocide selected from the group consisting of algicide, bactericide, and a combination thereof.

6. The concentrate as recited in claim 1 wherein the polycarboxylic acid contains at least one hydroxyl group.

7. The concentrate as recited in claim 2 wherein the low molecular weight alcohol is selected from the group consisting of ethanol, isopropanol, and a mixture thereof.

8. A water dilutable concentrate for use in lithographic fountain solutions containing 58.7 wt. % water 20.5 wt. % of a buffer salt comprising the salt of citric acid and dimethylamine.

7 wt. % polyvinylpyrrolidone 5.3 wt. % of ethanol 3.5 wt. % isopropanol 5.0 wt. % biocide wherein said concentrate, when mixed with water in an amount of about 1% to about 6% by weight, yields a fountain solution having a pH between about 4.7 and about 5.3, a surface tension between about $32\times10^{-3}$ Newton/m and about $52\times10^{-3}$ Newton/m, and a sufficient buffer effect such that the pH variation will be less than about one pH unit when 5 cc of decinormal NaOH or decinormal HCl is added to 100 cc of the fountain solution.

9. In a lithographic fountain solution containing water, a buffer, a polyol and a surfactant the improvement comprising, as the buffer, at least one salt of (a) a polycarboxylic acid and (b) an organic amine, wherein the polycarboxylic acid has a $pK_b$ between about 3 and about 6, the organic amine has a $pK_b$ between about 2 and about 9, and the fountain solution has a pH of between about 4.7 and about 5.3, a surface tension between about $32\times10^{-3}$ Newton/m and about $52\times10^{-3}$ Newton/m, and a sufficient buffer effect such that the pH variation will be less than about one pH unit when 5 cc of the decinormal NaOH or decinormal HCl is added to 100 cc of the fountain solution.

10. The fountain solution of claim 9 additionally containing 4 wt. %-10 wt. % of a low molecular weight alcohol.

11. The fountain solution of claim 9 wherein the polycarboxylic acid is citric acid and the organic base is dimethyl amine.

12. The fountain solution of claim 9 additionally containing 0.5 wt. %-6.0 wt. % of a biocide.

13. The fountain solution of claim 9 additionally containing 0.5 wt. %-6.0 wt. % of a biocide selected from the group consisting of algicide, bactericide or a combination thereof.

14. The fountain solution of claim 9 wherein the polycarboxylic acid contains at least one hydroxyl group.

15. The fountain solution of claim 10 wherein the low molecular weight alcohol is selected from the group consisting of ethanol, isopropanol and a combination thereof.

* * * * *